United States Patent

Carlson

[11] 3,907,949
[45] Sept. 23, 1975

[54] METHOD OF MAKING TUBULAR POLYCRYSTALLINE OXIDE BODY WITH TAPERED ENDS

[75] Inventor: William G. Carlson, Murrysville, Pa.

[73] Assignee: Westinghouse Electric Corporation, Pittsburgh, Pa.

[22] Filed: Nov. 8, 1972

[21] Appl. No.: 304,872

Related U.S. Application Data

[63] Continuation-in-part of Ser. No. 84,368, Oct. 27, 1970, abandoned.

[52] U.S. Cl. .................. 264/6; 249/62; 264/57; 264/59; 264/63; 264/65; 264/66; 264/71; 264/85; 264/313; 264/317; 264/DIG. 44; 313/220; 425/DIG. 12
[51] Int. Cl.² ........................................... C04B 35/64
[58] Field of Search ......... 264/65, 84, 88, 313, 317, 264/59, 314, 13, 57, 63, 66, 71, 85, 6, DIg. 44; 313/220; 249/62; 425/DIG. 12

[56] References Cited
UNITED STATES PATENTS

| | | | |
|---|---|---|---|
| 2,251,454 | 8/1941 | Jeffery | 264/56 |
| 3,026,210 | 3/1962 | Coble | 106/42 X |
| 3,450,924 | 6/1969 | Knochel | 313/220 |
| 3,499,066 | 3/1970 | Murray | 264/314 X |
| 3,564,328 | 2/1971 | Bagley | 264/57 X |

FOREIGN PATENTS OR APPLICATIONS

847,775  9/1960  United Kingdom................... 264/84

OTHER PUBLICATIONS

T. M. Wehrenberg et al., "Isostatic Pressing Large Refractory Blocks," Ceramic Bulletin, July 1968, 642–645.

*Primary Examiner*—Robert F. White
*Assistant Examiner*—Thomas P. Pavelko
*Attorney, Agent, or Firm*—B. R. Studebaker

[57] ABSTRACT

A single piece open ended polycrystalline oxide body having a generally tubular configuration with a smaller internal diameter at its ends than the internal diameter adjacent its mid-portion. The body is produced by isostatic pressing of prepared small uniform spherical agglomerates of the oxide powder in a urethane outer mold carrying a preshaped low melting point metal mandrel. The mandrel is removed after pressing by melting and the remaining oxide body is then sintered in a hydrogen atmosphere at high temperature to produce the polycrystalline structure.

8 Claims, 3 Drawing Figures

WITNESSES
Robert C. Baird
Leo M. Garman

INVENTOR
William G. Carlson.
BY
Blair R. Studebaker
ATTORNEY 3,907,949

METHOD OF MAKING TUBULAR POLYCRYSTALLINE OXIDE BODY WITH TAPERED ENDS

CROSS REFERENCE TO RELATED APPLICATION

This is a continuation-in-part of application Ser. No. 84,368, filed Oct. 27, 1970 by W. G. Carlson for Tubular Polycrystalline Oxide Body With Tapered Ends And Method of Making Same, now abandoned.

BACKGROUND OF THE INVENTION

Refractory polycrystalline oxides because of their high temperature capabilities and chemical resistance to metallic vapors have found utility as a new form of arc tube for gas discharge lamps. Recent advances in materials and process technology as for example that disclosed in U.S. Pat. No. 3,026,210 for Transparent Alumina and Method of Preparation, permits the fabrication of polycrystalline oxide bodies of theoretical density. The sintering of these materials to theoretical density elminates substantially all porosity resulting in a high degree of light transmittance since the pores, which are typically of a size to give maximum light scatter, have been eliminated. The polycrystalline refractory oxide that has been of the most interest for application as an envelope for an alkaline metal vapor lamp is aluminum oxide. Dense polycrystalline alumina in tubular form provides a translucent, non-reactive (chemically), container for the vapors of mercury and an alkali metal, such as sodium at the high temperatures and pressure required for high lamp efficiency with a satisfactory spectral output for lighting. Typically, these aluminum oxide envelopes for alkali metal vapor lamps are tubular in shape being approximately 100 millimeters in length, 8 millimeters in outside diameter and have a 0.75 millimeter wall thickness.

A typical and currently used construction for the arc tube of a ceramic discharge lamp is disclosed in U.S. Pat. No. 3,497,756 to W. J. Knochel et al for Ceramic Discharge Lamp Having a Flexible Metal Electrode Connector. In fabricating the conventional arc tube illustrated in U.S. Pat. No. 3,497,756 a tubular polycrystalline alumina body is closed off at its ends by cup-shaped caps which carry the electrodes on the inner side thereof and lead-in conductors and the exterior side of the end cap. Generally, one end cap includes a tubular lead therethrough which is welded to the cup and extends coincident with the cup axis into the interior of the arc tube body to provide access for inserting the lamp additive and also serve as a welding post for one electrode. In this conventional construction several hermetic seals are required which must be able to both endure attack from the alkali metal vapors within the lamp as well as withstand the high lamp temperatures during the life of the lamp. The end caps are sealed to the ends of the lamp. The end caps are sealed to the ends of the aluminum oxide tube with a ceramic sealing glass and the exhaust and fill tubulation is brazed to one of the end caps forming the second seal.

In all arc discharge lamps, both the ceramic type and the conventional high-pressure mercury vapor type employing a quartz arc tube, the discharge within the lamp is controlled to some extent by the cold spot temperature within the arc tube. The cold spot temperature is of course the temperature of the coldest point inside the arc tube and generally occurs behind the electrodes. One method of increasing this cold spot temperature and hence the condition of the discharge between the electrodes is to reduce the area behind the electrode. U.S. Pat. No. 3,450,924 for Sealing Means for Refractory Ceramic Discharge Device Envelopes by W. J. Knochel et al illustrates one method by which the area behind the electrode is reduced and hence the cold spot temperature increased in a ceramic discharge lamp. In this patent elaborate end closure members having particular constructions are employed to reduce the area behind the electrodes.

SUMMARY OF THE INVENTION

This invention relates to arc tubes for ceramic discharge lamps and more particularly to a tubular polycrystalline oxide arc tube body with tapered ends and the method of making such arc tube body.

The arc tube body of this invention obviates many existing problems in the manufacture and performance of ceramic discharge lamps. The arc tube body of this invention includes a configuration which eliminates the necessity for meticulously preparing the tube ends for sealing, eliminates the need for refractory metal end caps and additionally reduces the number of seals required in the manufacture of a lamp body.

The foregoing are accomplished in accordance with this invention by providing a single piece, open ended, translucent polycrystalline oxide body formed from the oxide powder and having a generally tubular configuration, said body having a smaller internal diameter at its ends than the internal diameter of the body adjacent the mid-point thereof. The arc tube body of this invention is produced by isostatically pressing prepared small uniform spherical agglomerates of the oxide powder in a urethane outer mold carrying a preshaped low melting point metal mandrel centrally disposed therein. The mandrel is removed after pressing by melting and the remaining oxide body is then sintered in a hydrogen atmosphere at a high temperature for a predetermined time to produce the polycrystalline structure.

BRIEF DESCRIPTION OF THE DRAWING

Many of the attendant advantages of this invention will become more readily apparent and better understood as the following detailed description is considered in connection with the accompanying drawing, in which.

DESCRIPTION OF THE PREFERRED EMBODIMENT

Figure 1:
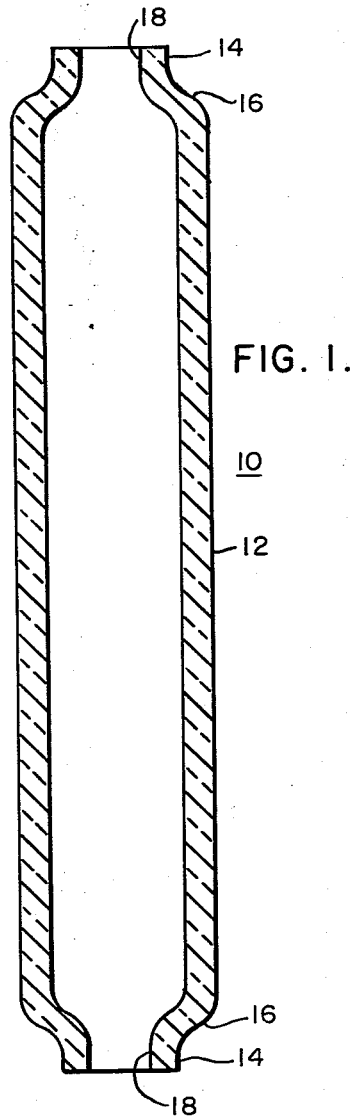
FIG. 1 is a sectional view of a ceramic body constructed in accordance with this invention.

Referring now in detail to the drawing wherein like reference characters represent like parts throughout the several views there is illustrated in FIG. 1 a tubular polycrystalline oxide body with tapered ends formed in accordance with the method of this invention. The tubular body generally designated 10 includes a larger diameter central portion 12 extending for the majority of the length of the tubular body member and a pair of smaller diameter end portions 14 which are connected to the larger diameter central portion by tapered portions 16. For use in ceramic discharge lamps the portion 12 preferably has an outside diameter of about three-eighths inch with a 30 mil wall thickness and a length of from 4 to 4½ inches. The smaller diameter end portions 14 have an outside diameter of about one-sixth inch and the internal diameter of the openings 18 in each end of the tubular body are about one-eighth inch in order to receive a one-eighth inch O.D. tubulation or rod to support the electrode.

Figure 2:
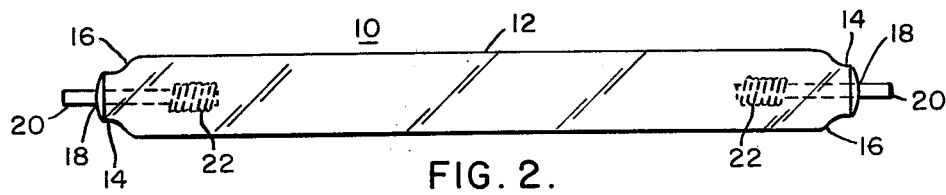
FIG. 2 is a side elevational view of a ceramic arc tube employing a body prepared in accordance with this invention.

FIG. 2 illustrates a ceramic arc tube for a ceramic discharge lamp and is illustrative of one use for the tubular polycrystalline oxide body of this invention. The ceramic arc tube includes the polycrystalline oxide body generally designated 10 which has sealed through the end apertures 18 refractory metal rods or tubulations 20. The rods or tubulations 20 carry on their inner ends discharge sustaining electrodes 22.

This invention relates to the process for manufacturing the ceramic body of FIG. 1. Sub-micron size polycrystalline oxide particles are disposed in an aqueous vehicle to form a slurry and the components are fed into a spray dryer to form uniform spherical agglomerates from the smaller polycrystalline oxide particles. In the preferred embodiment 100 parts by weight of $Al_2O_3$ and 0.25 parts by weight of MgO are blended with 3 parts by weight of a temporary, organic or fugitive binder, as for example water soluble polyvinyl alcohol, and 180 parts of water to form a slurry. If desired, a small amount of lubricant may be employed to soften or lubricate the mixture. Polyethylene glycol is suitable for this purpose. The aluminum oxide powder is of approximately 0.3 micron size. Of course, the constituents of the slurry can be modified, depending on the oxide used to form the tube, its particle size and the capabilities of the spray dryer employed as will as well understood by those skilled in the art. The slurry is fed into the spray dryer and uniform spherical agglomerates of about 50 microns in diameter are produced. The spray dry method of drying is preferred because it forms particulate matter or powder with good flow characteristics which is needed to uniformly fill the restricted mold cavity illustrated in FIG. 3.

Figure 3:
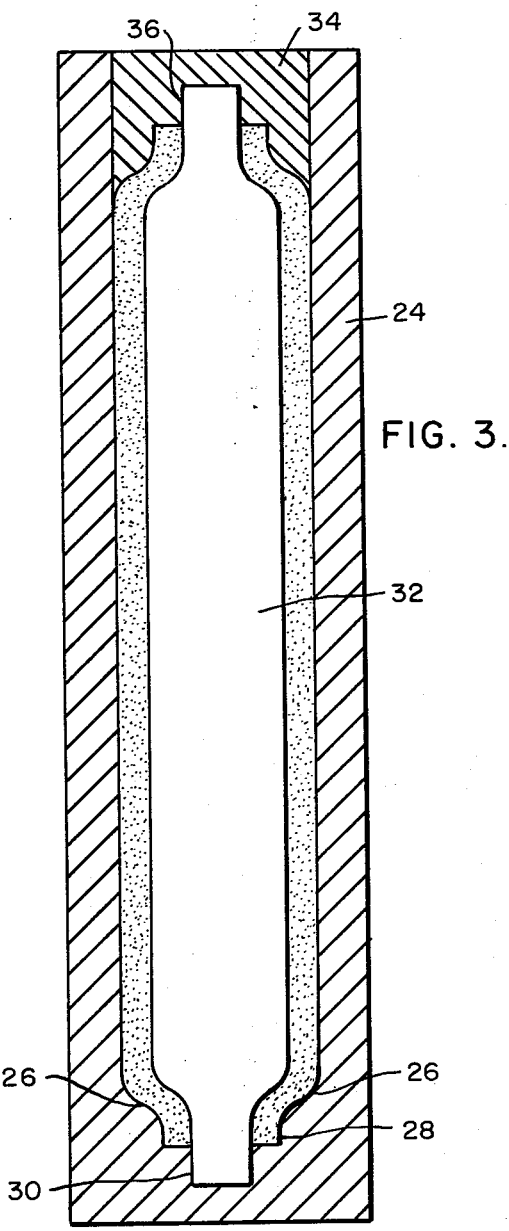
FIG. 3 is a sectional view of the urethane mold employed in the process of this invention.

The mold form employed in practicing the method of this invention is illustrated in FIG. 3 and includes an outer urethane mold form 24 which has a substantially uniform internal diameter of about 1 inch throughout its length with the exception of the bottom portion which includes a tapered section at 26 reducing the internal diameter to a small diameter at 28. At the bottom of the mold cavity is a mandrel aligning cavity at 30 which serves to receive the mandrel 32 and aids in maintaining the mandrel in a concentric relationship with the interior surface of the outer mold form 24. The mandrel 32 which serves to form the interior surface of the ceramic body may be formed of any of the well known low melting point metals such as bismuth, tin and lead or alloys which contain any of the aforementioned metals as their principal constituent as for example type metal or wood metal. Such metal or alloy should preferably have a melting point below about 350°C. A powder fill and centering funnel (not shown) is employed to insert the spray dried spherical agglomerates or powder into the mold around the mandrel. This powder fill and centering device holds the upper tapered end of the mandrel concentric with the inner surface of the outer mold form 24 while the powder is being placed about the mandrel within the outer mold form. A predetermined weighed amount of spray dried spherical agglomerates or powder is placed in the mold cavity space about the mandrel and is mechanically vibrated for several minutes to insure a uniform filling of the cavity. A urethane closure plug 34 having an internal aperture 36 to receive the upper tapered end of the mandrel 32 is then inserted into the opening at the upper end of the outer mold form 24.

The mold form 24 carrying the mandrel 32 with the space between the mandrel and the interior of the mold form filled with the spray dried powder is placed into an isostatic press and the powder is isostatically pressed against the mandrel at a pressure of from between about 5,000 to 15,000 psi, preferably about 9,000 psi. The pressed envelope with the mandrel embedded therein is then removed from the urethane outer mold form and the pressed part is then heat treated in a non-oxidizing atmosphere such as nitrogen or preferably 95% volume $N_2$ 5% volume $H_2$ forming gas, while the envelope is maintained in a near vertical position. The heat treating is accomplished at a temperature just above the melting point of the mandrel and the forming gas prevents oxidation as the metal melts and flows from the envelope. After the metal has been removed completely by melting, the remaining aluminum oxide envelope is heat treated in air at about 1,000°C for about 1 hour to remove any remaining binder and to partially sinter the envelope and impart some strength for subsequent handling. This presintered tubular polycrystalline oxide body is then subjected to a final sintering at 1,700°–1,800°C in hydrogen for a period of from 2 to 24 hours, preferably this final sintering should be at 1,700°C in hydrogen for a period of about 16 hours which produces a material of theoretical density free of substantially all porosity.

There appears to be a direct relationship between the pressure used in the isostatic press to form the body and the amount of final sintering required. For example if the body is pressed at 15,000 psi only 2–4 hours of final sintering is required whereas if the body is pressed at about 9,000 psi then the sintering time required is about 16 hours.

As will be apparent from the foregoing, the method of this invention produces a single piece translucent polycrystalline oxide body having a generally tubular configuration with a smaller internal diameter at its ends than the internal diameter along its middle length and has particular application as an arc tube body for a ceramic discharge lamp. The smaller ends provide a reduced area behind the electrode of the arc tube and the small apertures in each end of the tube as compared with the internal diameter of the main middle portion of the tube permit the closing off of the arc tube body with a single seal between the internal surface of the arc tube end and a rod or tubulation extending therethrough to support the electrodes at each end of the arc tube.

I claim:
1. The method of making a tubular polycrystalline oxide body having tapered ends comprising the steps of;
   forming an aqueous slurry which principally comprises alumina, water and a fugitive binder feeding the slurry into a spray dryer to form larger uniform spherical agglomerates from the smaller oxide particles,
   placing the spray dried spherical agglomerates into a mold having a low melting point preshaped metal mandrel centrally thereof, said preshaped mandrel having end portions of smaller diameter than the central portion thereof and a melting point below 350°C, mechanically vibrating the mold for several minutes to uniformly fill the cavity, within said mold about said mandrel, isostatically pressing said spherical agglomerates at a predetermined pressure of about 9,000 psi, removing the pressed oxide body containing the mandrel from the mold and heating the body in a non-oxidizing atmosphere while in a near vertical orientation to thereby melt said mandrel and permit said mandrel metal to flow from said body, presintering the oxide body at a first predetermined temperature for a first predetermined time to remove the remaining binder and partially sinter said envelope, and finally sintering the body at a second predetermined temperature in hydrogen for a second predetermined time to thereby produce a translucent polycrystalline oxide body with tapered ends.

2. The method of making a tubular polycrystalline oxide body according to claim 1 wherein said aqueous slurry principally comprises about 100 parts by weight of $Al_2O_3$ and 180 parts by weight of water in addition to a predetermined amount of a fugitive binder and MgO.

3. The method of making a tubular polycrystalline oxide body according to claim 1 wherein said non-oxidizing atmosphere principally comprises nitrogen and said oxide body is heated to a temperature only slightly higher than the melting point of said mandrel to remove the mandrel from within said body.

4. The method of making a tubular polycrystalline oxide body according to claim 1 wherein said first predetermined temperature is about 1,000°C and said first predetermined time is about 1 hour.

5. The method of making a tubular polycrystalline oxide body according to claim 1 wherein said second predetermined temperature is between about 1,700° to 1,800°C and said second predetermined time is from between about 2 to 24 hours.

6. The method of making a tubular polycrystalline oxide body according to claim 1 wherein said first predetermined temperature is about 1,000°C, said first predetermined time is about 1 hour, said second predetermined temperature is about 1,700°C and said second predetermined time is about 16 hours.

7. The method of making a tubular polycrystalline alumina body having end portions of smaller internal and external diameter than the mid portion thereof comprising the steps of:

disposing a preshaped mandrel having end portions of smaller diameter than the central portion and formed of a metal having a melting point below 350°C, centrally of an outer mold form, filling said mold form about said mandrel with alumina particles of predetermined size, vibrating said mold form for several minutes to uniformly fill the space between the mold form and said mandrel with alumina particles, isostatically pressing said particles at a predetermined pressure of about 9,000 psi removing the pressed alumina body containing the mandrel from the mold and heating the body in a non-oxidizing atmosphere while in a near vertical orientation to thereby melt said mandrel and permit said mandrel metal to flow from said body, and sintering the alumina body at a predetermined temperature for a predetermined time to thereby produce a translucent polycrystalline alumina body with tapered ends.

8. The method of claim 7 wherein said preshaped mandrel principally comprises a low melting point metal selected from the groups consisting of bismuth, lead and tin.

* * * * *